United States Patent
Hamor

(10) Patent No.: US 8,219,484 B2
(45) Date of Patent: *Jul. 10, 2012

(54) METHODS AND SYSTEMS FOR FACILITATING BIDS ON PRODUCTS AND SERVICES

(76) Inventor: Alan Hamor, Pennington, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/215,137

(22) Filed: Aug. 22, 2011

(65) Prior Publication Data

US 2011/0307346 A1    Dec. 15, 2011

Related U.S. Application Data

(63) Continuation of application No. 11/234,359, filed on Sep. 23, 2005, now Pat. No. 8,005,744.

(51) Int. Cl.
*G06Q 40/00* (2012.01)

(52) U.S. Cl. .......................................................... 705/37
(58) Field of Classification Search ............... 705/35–45
See application file for complete search history.

(56) References Cited

U.S. PATENT DOCUMENTS

2003/0023537 A1 * 1/2003 Joshi et al. ...................... 705/37

* cited by examiner

*Primary Examiner* — Rajesh Khattar
(74) *Attorney, Agent, or Firm* — Charles A. Rattner

(57) ABSTRACT

Methods and systems for bidding on items include a predetermined price or range associated with an item, the price not disclosed to bidders. Successful bids conform to a predetermined success rule(s) determined independently of the amounts of other bids. Successful bids can be immediately communicated to the successful bidders. Price adjustments, typically discounts, can be determined and communicated prior to fulfillment.

10 Claims, 2 Drawing Sheets

METHODS AND SYSTEMS FOR FACILITATING BIDS ON PRODUCTS AND SERVICES

CROSS REFERENCE TO RELATED APPLICATIONS

Figure 1:
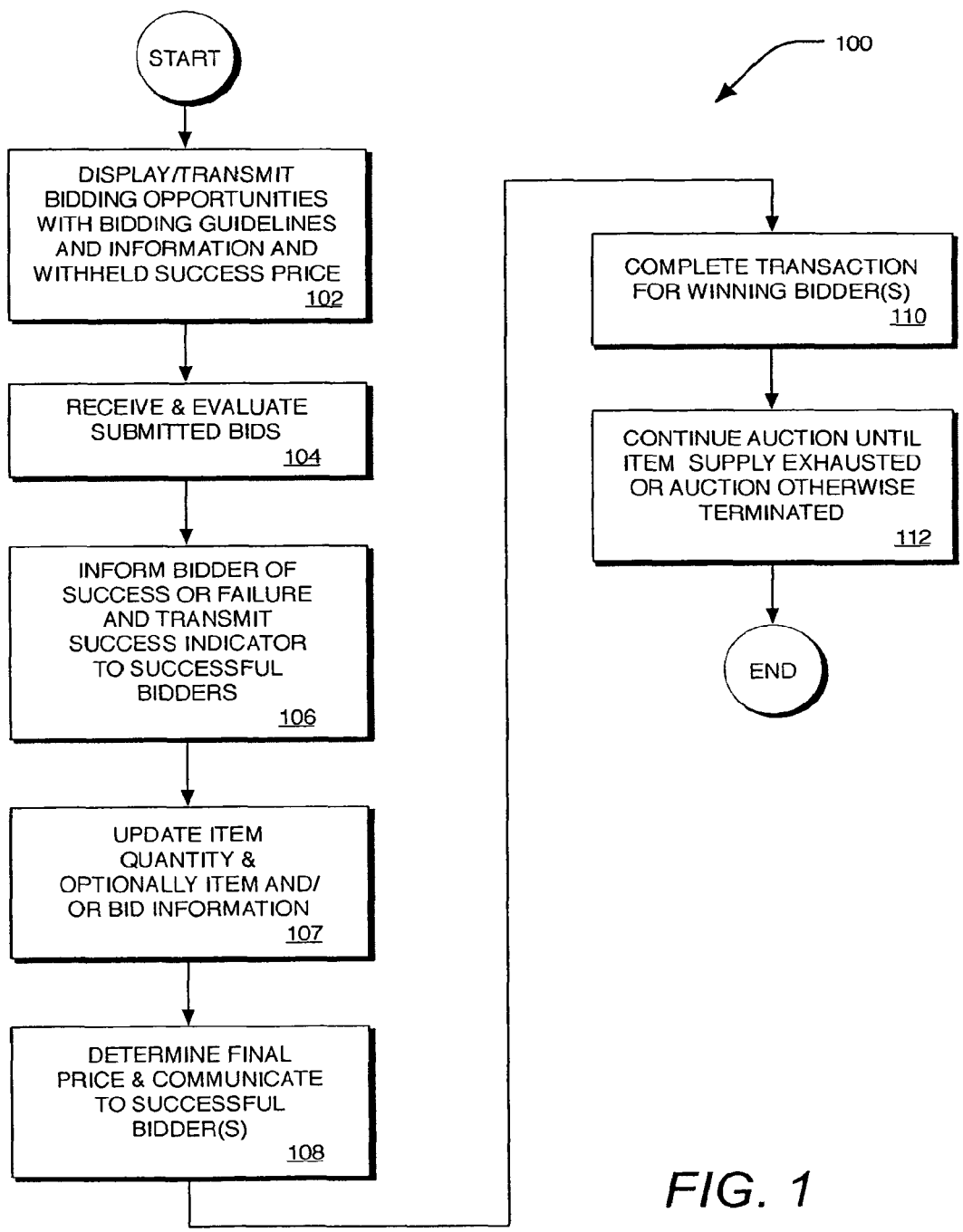

This application claims priority under 35 U.S.C. §120 as a continuation of U.S. patent application Ser. No. 11/234,359 entitled "METHODS AND SYSTEMS FOR FACILITATING BIDS ON PRODUCTS AND SERVICES" filed on Sep. 23, 2005 in the name of Alan Hamor, which issues as U.S. Pat. No. 8,005,744 on Aug. 23, 2011, the entirety of which is incorporated by reference.

FIELD OF THE INVENTION

The invention relates generally to commercial transactions, and more particularly to bidding systems.

BACKGROUND OF THE INVENTION

In today's world, there are numerous products and services available for purchase. There are also more choices than ever on how to purchase the products and services. For example a buyer can purchase items in a store or on the Internet, conventionally or through an auction process, using cash or other forms of payment, etc.

Sellers use various techniques to motivate buyers to make purchases. For example, sellers provide discount coupons, mark down prices during a sale, sponsor various inventory liquidation events and/or allow customers to bid on items in an auction. Many of these sales techniques encourage buyers to 'hold out' for anticipated low pricing, causing not only an erosion of profit margins for the seller, but also an increase in the inventory holding costs to a seller.

Sellers have embraced dynamic pricing, for example in the form of auctions, as a way to increased levels of interest from customers while maintaining desirable profit margins. Various types of auctions are known. The most common type of auction is an English auction where the bidder who places the highest bid over the reserve price, a price set by the seller, wins the item at the end of the bidding period. In a variation of the English auction known as a quick win auction, the auction ends when the bid reaches a predetermined threshold set by the seller. In a turbo auction, also a variation of the English auction, a starting price is specified, no reserve price is allowed and the highest bidder wins.

In a Dutch auction, the auctioneer begins with a high asking price which is lowered in increments. The price lowering continues until a bidder is willing to pay the asking price or a predetermined minimum price is reached. If multiple items are being sold, as successful bidders reserve their quantities to be purchased, the auctioneer continues lowering the asking price until all items are sold. In a uniform or second price auction (sometimes also called a Dutch auction) an item is awarded to the highest bidder at a price equal to the second highest bid. In a variation of the uniform price auction for multiple identical items (also sometimes called a Dutch or multiple auction), bidders specify their bids and how many of the available items they would like to purchase. At the end of the bidding period all winning bidders pay the lowest winning bid per item. In a variation of the uniform price auction for multiple identical items, known as a Yankee auction, at the end of the bidding period all winning bidders pay their exact winning bid.

In a fixed price auction, a bidder who first bids the fixed price wins. In a variation of a fixed price auction, known as an auto markdown auction, the fixed price drops over time. In a Chinese auction, typically employed in a charity event with donated items, each bidder bids the same amount on an item, typically using a pre-printed ticket, and the winner is selected by lottery. The charity selects the winning bid from a pool of bids for the item. In a silent or sealed bid auction, all bids are secret and the highest bidder wins. In a procurement auction, a buyer puts out a request for proposal RFQ, providers offer progressively lower prices and at the end of the auction the lowest bid wins.

Despite their variety and their common acceptance and usage, auctions pose many problems for both buyers and sellers. In many types of auctions, the seller loses control of the final price of the auctioned item, which is determined by the bidder and auction process. Many types of auctions are competitive; forcing winning bidders to successfully compete against other bidders in a sometimes uncomfortable and expensive process. In many types of auctions, there is a waiting period between the time a bidder bids for an item and the time the bidder knows if his bid is successful, leaving the bidder in uncertainty. These characteristics often make existing auctions less than desirable for buyers and sellers of items.

SUMMARY OF THE INVENTION

The present invention provides methods and systems which overcome many of the drawbacks and disadvantages of existing auctions, while providing many of the benefits and motivations of the auction format.

In accordance with an embodiment of the present invention, there are provided methods and systems to process bids, an exemplary method comprising: identifying for sale an item having a floor price; displaying, using the computer, the item for bidding by at least one bidder; suppressing, during the displaying, the floor price such that the floor price is not available to the at least one bidder; limiting the at least one bidder to a predetermined number of bids on the item; receiving from the at least one bidder at least one bid on the item, the bid within the predetermined number of bids, the bid including a bid price; comparing on the computer the bid price to the floor price; and if the bid price for the item is at least equal to the floor price, then substantially immediately notifying the at least one bidder of the success of the at least one bid.

In accordance with another embodiment of the present invention, there are provided methods and systems to bid on an item, an exemplary method comprising: displaying, using the computer, an item for bidding, the item having a suppressed floor price not available for viewing; receiving an opportunity to place up to a predetermined number of bids for the item; submitting at least one bid on the item, the bid within the predetermined number of bids, the bid including a bid price; and receiving, if the bid price for the item is at least equal to the floor price, a substantially immediate notice of the success of the bid.

In accordance with yet another embodiment of the present invention, there are provided methods and systems to sell an item, an exemplary method comprising: identifying for sale an item; identifying a floor price for the item; authorizing, using the computer, the item for display for bidding by at least one bidder with the floor price of the item suppressed by the computer to the at least one bidder; authorizing the receipt of a predetermined number of bids on the item by the at least one bidder; and authorizing, if a bid is received from the at least one bidder within the predetermined number of bids and including a bid price at least equal to the floor price, the substantially immediate transmission of a success indicator to the at least one bidder.

DESCRIPTION OF THE DRAWING FIGURES

Figure 2:
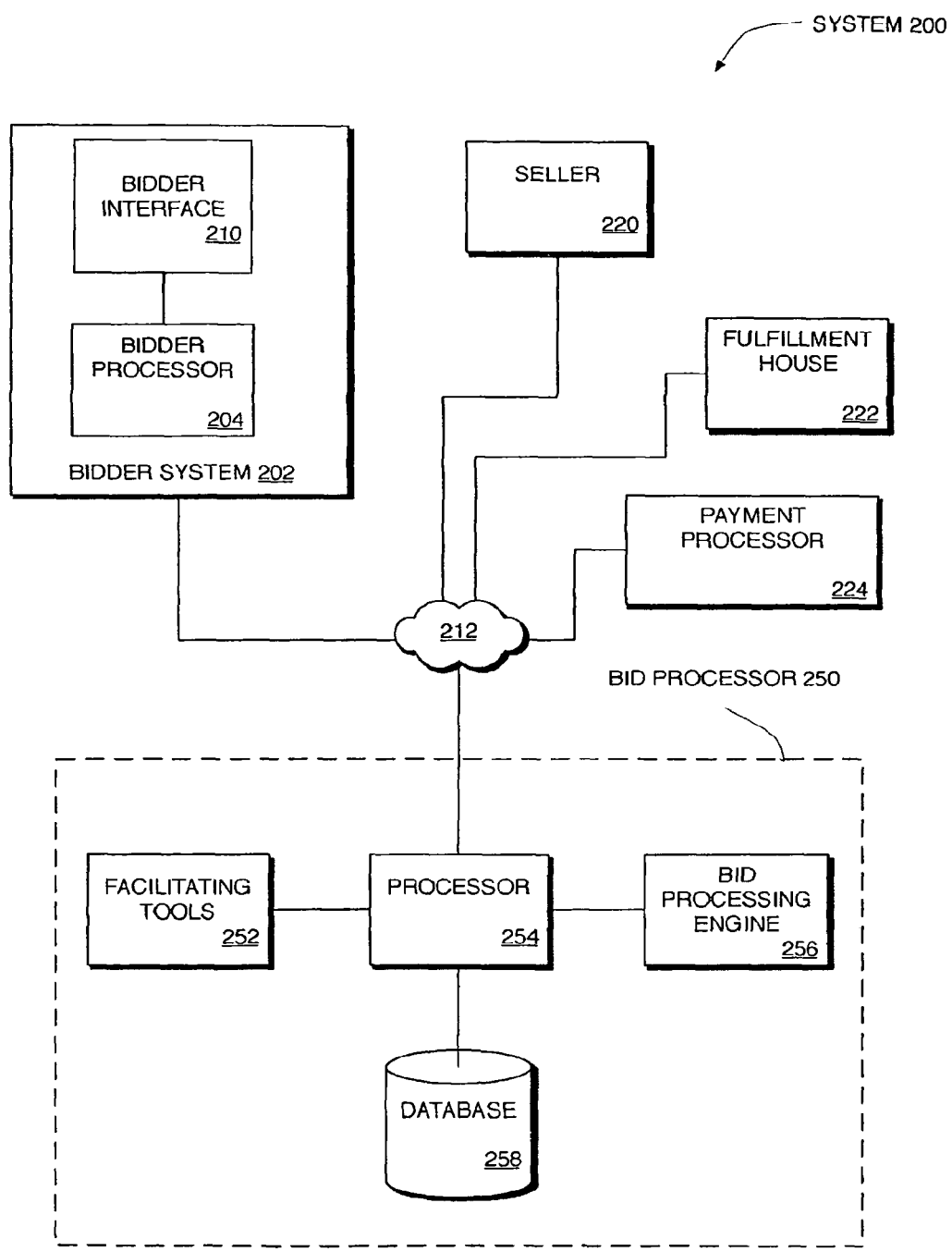

These and other objects, features and advantages of the present invention will be apparent from a consideration of the following Detailed Description of the Invention when considered with the drawing Figures, in which:

FIG. 1 is a flowchart illustrating a method for bidding on an item in accordance with the present invention; and FIG. 2 is a block diagram of a bidding system in accordance with an embodiment of the present invention.

DETAILED DESCRIPTION OF THE INVENTION

Provided herein are new and improved bidding methods and systems that guarantee sellers receipt of at least a desired price while providing buyers with the motivation of naming their own bid price along with the instant gratification of knowing whether or not they have tendered an accepted bid. The invention is flexible as to the type of products and services that can be offered for bid, and can be implemented in a variety of different commerce scenarios, including, but not limited to: on a website where it facilitates commerce, on a website where it is the commerce, on websites offering product searches and listings, in a peer-to-peer network environment, through online advertisements and in an actual physical retail environment. Buyers using the present invention, also referred to as users or bidders, receive instant feedback as to whether their bids have been accepted and what quantities of goods they have purchased. New and innovative pricing mechanisms enable sellers to optionally offer and buyers to receive favorable pricing, often below the actual, accepted bid price.

It will be appreciated by the reader from a consideration of the following description of the invention that, in contrast to an auction, the present invention is better described as a bidding system. Generally, with respect to an auction, the function of the auction is to drive up of the price of the bids for items, maximizing the amount received by the seller. In contrast, with respect to the bidding system of the present invention, the function of the system is to encourage buyers to buy items within price ranges preset and acceptable to sellers. Thus, the bidding system of the present invention functions to encourage buyers to buy goods in a manner motivational to the buyer while meeting the pricing requirements of the seller.

As used herein, the phrases "for example," "such as" and variants thereof describing illustrative implementations of the present invention are exemplary in nature and not limiting.

In the description below, the term "item" and variants thereof as used to describe products and services transacted using the present invention include any tangible or intangible object of value. For example, items sold or purchased with the present invention can include: a product, a service, a warranty, a naturally occurring object, an animal, a financial instrument, a right to purchase an object under defined circumstances, a right to sell an object under defined circumstances, and others as will now be apparent to the reader. Depending on the embodiment, the condition of the item can be any condition, for example new, used or refurbished. For ease of description the singular form of item is used below to connote one item or a plurality of items which can be bid upon as one unit, as appropriate.

In the description below the meaning of the term "price range" and variants thereof as used to describe the price of items include: one price only, a plurality of prices and ranges of prices. "Sellers" and variants thereof refer to parties selling items using the present invention, while "buyers," "bidders," and variants thereof refer to parties placing bids to buy items using the present invention.

With reference now to FIG. 1, there is shown a method 100 for bidding on an item, according to an embodiment of the present invention. Method 100 will be described in conjunction with the system illustrated in FIG. 2, which will now be described.

With reference now to FIG. 2 there is shown a bidding system 200 including a bid processor 250 with a bid processing engine 256. Bid processor 250 is connected through an appropriate communication interface 212 to one or more bidder systems 202. Bid processor 250 is further seen to include a processor 254 connected to bid processing engine 256, a database 258, and optionally to a set of facilitating tools 252, the functions of which are described herein below.

A seller 220, a fulfillment house 222 and a payment processor 224 are connected to communicate with bid processor 250. As described in detail herein, seller 220 comprises a party(s) placing items for bid in accordance with the present invention. Fulfillment house 222 comprises a conventional service for providing goods or services to purchasers, while payment processor 224 comprises a conventional credit card, bank, debit card or other payment account processor.

Bid processor 250 may comprise any combination of conventional components, for example an Intel® microprocessor operating a conventional operating system with appropriate software to perform the functions described herein. Bid processing engine 256 may comprise a separate processor from processor 254, functionality provided by the processor 254 itself, or a combination of both. Tools 252 may be contained in database 258 and operated by processor 254 and/or bid processing engine 256. While, for purposes of description, bid processor 250 has been shown as a simple, consolidated system, it will be apparent to the reader that the invention is not thus limited. Bid processor 250 can be located in any appropriate location and can be operated by any entity. Bid processor 250 may, in a manner well known in the art, comprise a decentralized system utilizing interconnected components from a variety of geographically disparate locations. Exemplary configurations of bid processor 250 are described below.

While, for purposes of illustration, only a single one each of bidder system 202, seller 220, fulfillment house 222 and payment processor 224 are shown, it will be understood that any number of such parties, the functions of which are described below, may be included in system 200.

Each bidder system 202 is shown to include a bidder interface 210 and a bidder processor 204. In different embodiments, a bidder system 202 may be personal to an individual bidder, or a group of inter-related bidders, or may be shared by unrelated bidders. Examples of a personal bidder system 202 include inter-alia: a programmable cellular phone, telephone, fax machine, computer, television, and personal digital assistant, which is owned by or typically used by a particular individual or a limited group of individuals. Alternatively, each bidder system 202 may be shared by unrelated individuals. Examples of a shareable bidder system 202 includes inter-alia: a programmable cellular phone, telephone, fax machine, computer, television, and personal digital assistant, which is set up in a store or in another public location where it is available for use by multiple, typically unrelated individuals. Another example of a shareable bidder system 202 includes a visible programmable tag attached to or which promotes an item available for bids. Examples of such visible, programmable tags include portable digital devices, LCD tags, etc.

It will be understood by the reader that, in the various embodiments of the bidder systems 202 described above, the various bidder interfaces 210 and processors 204 comprise the user interfaces and processors contained in the described devices, respectively. It will further be understood that, while a single bidder system 202 has been shown and described, any number of bidder systems may be included in system 200.

Facilitating tools 252 can vary depending on the embodiment and can be made up of any combination of software, hardware and/or firmware that performs the functions as defined and explained herein. In one embodiment tools 252 include any of the following inter-alia: tools to help a bidder search for an appropriate item on which to bid (for example by asking evaluation questions to a bidder), tools to suggest an appropriate item for a bidder to bid on, tools to allow bidders to form bidding teams, tools to provide information to team members and others about an item available for bidding, tools to allow a bidder to rate an item, a bid initiator, the bidding process, etc, and tools to provide messages to bidders. More details on facilitating tools 252 are provided herein below. Facilitating tools 252 can similarly provide tools for sellers to use, the details of which are described herein below.

Communication interface 212 can provide any single communication channel or combination of communication channels appropriate for the various parties to communicate with each other and with processor 250. Communication interface 212 can thus comprise, for example: the Internet, a different public network, a private network, a telephone network, a peer-to-peer software network, various types of wireless networks, combinations thereof and others as will now be apparent to the reader.

With reference back to FIG. 1, various processes are now described for operating bidding system 200 in accordance with the illustrated embodiment of the present invention. Considering now the process, in stage 102, a bidding opportunity for an item is presented to a bidder. In accordance with a feature of the invention, the number of units of the item allocated to the bidding opportunity by the seller can be any quantity, i.e. one or more units, the exact quantity typically not made known to bidders. The bidding opportunity that is presented to the bidder is generated by bid processor 256 and made available to the bidder through a bidder system 202. In order to generate the bidding opportunity, one or more sources of data can used, as will be described in more detail below.

As determined by the seller to meet the needs of the seller and to motivate buyers, the bidding opportunity that is presented to the bidder includes some amount of information about the item, the seller, the bidding process, etc. For example, the presented bid opportunity may include one or more of the following, inter-alia: the identity of the seller, the name of the item, the quantity of the item available for bidding, whether the item is grouped with other similar items for the bidding, any limit on how many bids may be taken by the bidder and how many by the bidding team, the condition of the item (e.g. new, used, refurbished), the allowed locale of the bidder (e.g. local, regional, national or international relative to the location of the item), the suggested retail price for the item, a buy it now price (i.e. a price in which the item can be bought or sold without bidding), ratings on the seller, ratings about the item, any constraints on bidding amounts (for example minimum or maximum allowable bidding amounts, a plurality of predetermined amounts one of which must be selected as the bidding amount, etc), and the associated success rule (i.e. what relationship the bidding amount bid by a bidder has to have with a predetermined price range in order to be successful). However, in accordance with another feature of the invention, in all embodiments, the bidding opportunity is presented without presenting the predetermined price range for the item, where a bid will be successful if the relationship between the amount bid and the predetermined price range conforms to a predetermined associated success rule.

It will be understood by the reader that the "buy it now" price is separate and distinct from a predetermined, successful bid amount or range. More particularly, the "buy it now" price represents a fixed amount at which an item may be purchased. It need have no particular relationship to the bid amount or bid range at or within which the item may be purchased by bidding. It will thus be understood that the display of a "buy it now" purchase price is not inconsistent with the feature of the invention that the successful bid price or range is suppressed and not made available to buyers.

As the reader is aware, it is difficult to keep information secret, and the security surrounding the predetermined price of the item may vary depending on individual situations. In some cases, bidders may be able to acquire knowledge of the predetermined price range, for example from previous bidders, from an over-eager seller of the item, etc. Therefore, while it is a feature of the invention that the price range is not presented (i.e. disclosed) to the bidder as part of the bidding process, there is no limitation on whether the bidder may obtain knowledge of the price range through means other than presentation through the bidding process described herein.

In the described embodiment, the bidding opportunity is provided in stage 102 to the bidder through a bidder system 202. For example in one embodiment, bidder interface 210 includes a web browser and when the operator of the web browser accesses a web site with bidding engine bidder interface 210, the item and related bid information is received through network 212 and displayed on the interface by bidder processor 204. As another example, bidder interface 210 can comprise an electronic tag attached to the item, and when there is an opportunity to bid on the item, the bid processor and interface in the electronic tag signal to indicate that bidding is allowed on the item, for example through a visual or audio cue. As another example, bidder interface 210 includes an email server, receiving e-mail information from bid processing engine 256 through network 212 for display by bidder processor 204 on bidder interface 210. As yet another example, the bidder can learn about the bidding opportunity through an advertisement, for example on TV, on radio, on a billboard, on the World Wide Web or in a mailing, via telephone, via instant messaging, emailing or other form of communication.

In some embodiments facilitating tools 252 may have been used prior to or subsequent to the bidder being presented with the opportunity to bid in stage 102. For example, the bidder may use facilitating tools 252 to search for suitable items up for bidding. The bidder may use facilitating tools 252 to find out more information on the item in order to decide whether and how much to bid. The bid processor 250 may use facilitating tools 252 to tailor the bid opportunity to the bidder. As another example, the bidder may have received a message through facilitating tools 252 from another bidder about the bidding. The bidder may use facilitating tools 252 to generate or access bidding information about bids placed by other members of a bidding team to which the bidder belongs or to provide members with bidding strategies or actual bids to be made. Many different types of facilitating tools will now be apparent which facilitate the initiation of the bidding process by a bidder.

In stage 104, a bid on the item is received and evaluated. The bid includes inter-alia the bidding amount as bid by the potential buyer and optionally the desired quantity of items. As noted above, there may be variation or constraint in the number of units of an item on which a bidder can bid out of the total quantity of that item available for bidding. For example in one embodiment, a bidder can only bid on a limited number of units of an item whereas in another embodiment a bidder can bid on as many units of the item as the bidder desires up to the total quantity available for bidding. In one embodiment, the quantity of units of an item available for bidding must derive from one bidder, whereas in another embodiment the quantity of available units of an item can derive from one or more bidders (for example belonging to a bid initiator group).

In the described embodiment bidders submit bids through bidder system 202. The bid is received by bidder processor 204 and transmitted to bid processing engine 256 through communications link 212. Depending on the rules for the particular item up for bid, a bidder can bid any amount desired, choose from a selection of possible bidding amounts, or otherwise determine how much to bid in accordance with the rules for the particular item.

Once the bid is received, the bid is analyzed by bid processing engine 256. In one embodiment, there is a predetermined price range and a success rule associated with the item. For example, there may be a specified floor price per item and if the bidding amount per item is above the floor price per item, the bid is successful. As another example, there may be a specified floor span or range for an acceptable bid per item, and if the bidding amount per item is within the bounds of the range, the bid is successful. As another example, there may be a specified ceiling price per item and if the bidding amount per item is below the ceiling price per item, the bid is successful. Numerous pricing schemes and rules for successful bidding will now be apparent to the reader.

As noted above, in the described embodiment, bidders are limited to a single bid on an item (or group of items) so as to prevent 'trolling' to determine the lowest acceptable price. The bidder and/or bidder system 202 can be identified through any suitable method including inter-alia: cookies, email addresses, IP addresses, name, phone number, mailing address, credit card number, etc. It should be evident that the more unique the identifier used to check the identity of the bidder, the more likely to prevent bids by the same bidder over the allowed number of times. For example if identity is established through email addresses, a bidder who has more than one email address could potentially bid the allowed number of times more than once, using different email addresses.

In another embodiment, the bidder could theoretically bid as many times as desired, presumably within rules established for such bidding. For example, the bidder may have the right to bid two times and, if still unsuccessful, obtain supporting bids from bidding team members, who may have the right to bid one or more times on that item until either a successful bid has been made or all bidding rights have been exhausted. In yet another embodiment, team bidding may not be allowed and so the bidder may have the right to bid three times on an item and if unsuccessful, may have to bid the "Buy It Now" price in order to purchase that item. In any embodiment, either the bidder or the seller may decide what are the bidding rules for a specific item.

It is a feature and advantage of the invention that the success of a bid for an item is independent of the bidding amounts of other bidders for that item. That is, the success rules for a bid on an item are predetermined by the seller and do not change based upon the bids of others. Therefore whether a bid is successful can be determined once a bid has been made and independently of other bids. Continuing with reference still to stage 104 of FIG. 1, each incoming bid is received by bid processor 250 and evaluated by bid processing engine 256 to determine if the bid is successful. As shown in stage 106, a bidder is informed as to the success or failure of a bid, typically by a success indicator transmitted to a successful bidder from bid processor 250.

In some instances, a bidder may be required to purchase the item once the bid has been accepted. In another instance, the bidder receives the option to purchase the item once the bid has been accepted and the bidder can decline or ignore the option. In yet another instance, the bidder may have the right to transfer or even sell the right to purchase the successfully bid item to a third party. For ease of explanation it is assumed below that the bidder is required to purchase the item once the bid has been accepted.

The success indicator can include any indication that the bidder has submitted a successful bid and has the right to complete a transaction to procure possession of the item. For example, the success indicator can include a success code, i.e. e-commerce promotion code, which can be used by the bidder to purchase the item. As another example the success indicator can include a voucher or coupon, which can be used by the bidder to purchase the item, for example in a store or on the Internet. As another example, the success indicator can include a contract stating that the bid initiator agrees to sell the item to the bidder. As another example, if the bidder had previously provided account information, the success indicator can include a notice of payment charged to the account (credit received). As yet another example, the success indicator can include shipping/tracking information for receiving (sending) the item or a receipt for picking-up (having picked up) the item which was purchased (sold). In yet another example, the success indicator may include future purchase or sale rights for the specified item or other items in a peer-to-peer environment.

The success indicator may have intrinsic value and be transferable to others by the bidder. In another embodiment the success indicator is non-transferable.

In one embodiment, the success indicator indicates an extra reward if the bidding amount meets a predetermined price or price range. For example, if the predetermined price range is a floor price or ceiling price there could be an extra reward for a bid equal to the floor price or ceiling price. The extra reward can be one or more items related to or unrelated to the item bid upon. For example the reward can be a product related to the bid upon item, service for the bid upon item, a warranty for the bid upon item, and/or a gift unrelated to the bid upon item.

Continuing with reference to FIG. 1, at stage 107, if a bid is successful, bid processing engine 256 updates the number of remaining units of an item by subtracting the number of units of an item purchased by a successful bidder from the number of units of the item which were previously available. Optionally, the bid processor 250 (or operator of the bid processor) and seller may communicate to alter the terms with respect to any remaining items.

As shown in stage 108, the price paid by the bidder may differ from the successful bid price and must be determined. In one embodiment, the bidder pays the amount successfully bid for the item. In another embodiment, if a quantity greater than one unit of an item is available for bidding and the predetermined price is a range, each successful bidder pays the amount they have bid. In another embodiment, if a quantity greater than one unit of an item is available for bidding and the predetermined price is a range, each successful bidder pays the lowest successful bidding amount out of a plurality of successful bids placed for the item. In other words, in this latter embodiment, the price the bidder pays or receives is the bidding amount of the successful bid which is closest to the predetermined price floor. In this latter embodiment, the bidder may receive a success indicator which does not state the final price or the bidder may receive a success indicator with a temporary price and then when the final price is determined the bidder receives a credit or charge for the difference.

In some embodiments, bidders can use facilitating tools 252 to register and take advantage of bidding groups. For example, each bidding group member may have a home page with activity reports, messaging capability and other functions relating to creating and coordinating bidding teams. In this embodiment, members can communicate with each other regarding the bids, and bid processing engine 256 may transmit messages to members relating to the bidding activity of members of the group. In another group embodiment, any communication device or methodology including inter-alia email, instant message, system messaging, and cell phone text messaging can be used by bid processing engine 256 to communicate with team members, or by team members to communicate with each other. For example, if one member of a bidding group is successful, other members may decide to bid on an item using the same bidding amount used by the successful member or the other members may try to adapt the price in order to get closer to a lower price still within the success price range. As another example, if one member of a bidding group is unsuccessful, other members may know not to use the same bidding amount when bidding on the item.

In some embodiments, there may be more than one (not necessarily identical) item grouped together for bidding purposes. The group of items may derive from one or more sellers. There may be multiple price ranges associated with the group of items. Depending on the amount bid by a bidder, the bid may be successful for one or more of the items in the group, based on the associated rules for the predetermined price range for the items. For example, assume there are 5 Honda Civics which three car dealers are making available for bidding. Assume a black Civic from dealer 1 has the highest associated price range (in this case a floor of $14,000), two white Civics from dealer 1 and dealer 2 have the next highest price range (in this case a floor of $12,000), and two red Civics from dealers 2 and 3 have the lowest price range (in this case a floor of $11,000). Assume a bidding amount placed by a bidder of $12,500. In this case a white Civic or a red Civic can be bought by the bidder but not the black Civic. Depending on the rules for that bidding instance, the bidder may choose which of the qualifying items the bidder desires at any appropriate stage of the bidding process. Assume for simplicity of explanation that the bidder specifies a desired quantity of one unit in the bid. In one embodiment, the bidder can arrange the preferred order of grouped items (e.g. black, white, red) and submit the order with the bid in stage 104, and the success code returned in stage 106 would include the most preferred item for which the bid was successful (in this example white). As another example the bidder can be informed in stage 106 for which of the grouped items the bid was successful (white, red), and the bidder can choose one of the grouped items for which the bid was successful. As another example, the bidder in stage 110 (described below) can select one of the items for which the bid was successful as part of the transaction fulfillment stage. In embodiments where items are grouped together for bidding purposes, bid processing engine 256 may update the total number of units of all grouped items remaining after a successful bid.

Stage 110 of method 100 illustrates the execution of a transaction whereby a winning bidder(s) receives the goods or services successfully bid for. This stage 110 may be executed in one or more of many different embodiments as are described in detail below.

As mentioned above, bid processor 250 can be located in any appropriate location and operated by any appropriate operator.

The present invention may be operated in many different configurations as between the various parties. For example, in one embodiment, the bid processor 250 is operated by a centralized manager separate from sellers, typically an application service provider (ASP). In a second embodiment, the bid processor is operated by a seller, for example an online or store-front retailer or service provider. In yet another embodiment, the bid processor is operated by a centralized manager of a peer-to-peer networking environment or, in another variation, by the peers themselves. The reader will understand that, as used herein, peer-to-peer means in the conventional sense the sharing of files and information between users as enabled by an appropriate file sharing program such as Napster® or Gnutella®.

In this peer-to-peer configuration, the invention may be used by one or more peers (manufacturers, resellers, retailers, individuals or other entities) to buy and sell goods and services from one another. Thus, an individual bidder (1) might purchase an item from Sears, for example, and then sell it to a local hardware store, which, in turn, sells it to another individual bidder (2). The invention allows for the bidding and actual purchase to take place in the peer-to-peer network, while delivery of the goods might be made by Sears, in this example, directly to the individual bidder (2).

Facilitating tools 252 may include other tools which variously assist in the interaction between sellers, buyers and bid processor 250.

For example such facilitating tools may include one or more of the following functions inter-alia: tools to enable a seller to input data on an item up for bidding, tools to enable a seller to input data relating to the bidding process, tools to enable buyers to form buying groups or teams, tools to enable sellers and/or buyers to group items for bidding, tools to enable sellers to rate the bidders, tools to enable buyers to rate items and/or bidding processes, tools for facilitating message exchanges between buyers and sellers, tools to enable both buyers and sellers to analyze past bid processes, and a royalty calculation tool.

Other useful facilitating tools supported by 252 may enable bidders to register and take advantage of the buyer groups described above. For example, each buying group member may have a home page with activity reports, messaging capability and other functions relating to creating and coordinating one or more buying groups. In this embodiment, buyers can communicate with each other regarding the bids, and bid processing engine 256 may communicate messages amongst buyers relating to activity involving members of one or more buyer groups. It will be appreciated that any communication device or methodology including inter-alia telephone, email, instant message, system messaging, and cell phone text messaging can be used by bid processing engine 256 to communicate with buyer and/or seller group members, or enable group members to communicate with each other.

Examples of tools facilitating analysis of past bid processes include, inter-alia, tools for: viewing past bids for a comparable item to determine if the price range for future similar items should be adjusted, viewing location information of past bidders to determine if item listing or advertising information should be adjusted accordingly, and viewing profiles of past bidders to determine if items became available in their target market.

The data used to formulate a bid opportunity which is presented in stage 102 to a bidder, can originate from the seller, from the operator of bid processor 250, or if the two are different parties as a result of a consensus between both.

Facilitating tools may be used to automatically process, limit or alter seller's introduction of item information into bid processor 250, for example: limiting item listings from sellers with past bad histories or negative ratings, limiting item listings based upon known or anticipated buyer demographics, and others as will be apparent to the reader.

In other embodiments, facilitating tools 252 may include search capabilities that enable bidders to search for items. Other tools may enable automatic generation of bid opportunities for suitable items, for example pursuant to an ongoing agreement between the operator of system 200 and a buyer.

In one embodiment the price range for the items which can be bid on is input by the seller. In another embodiment, the operator of bid processor 250, if different than the seller, may select a price range or may reach a consensus with the seller on an appropriate price range.

In one embodiment, the bid initiator can input the quantity of units of each item which is available for bidding and/or any staggering schedule for how the quantity of items will be made available for bidding. For example, a staggering schedule could allow for a fixed number of units to be up for bidding each month out of the total quantity available. In another embodiment the seller indicates the total quantity of units of the items which the seller wishes to sell, and in some cases the operator of bid processor 250 may determine the number of units to be put up for bidding out of the total quantity which the seller wishes to sell or buy, and/or any staggering schedule. In yet another embodiment, the operator of bid processor 250 may with the seller reach a consensus on the number of units up for bidding and any staggering schedule.

In one embodiment, the seller can also indicate if any (not necessarily identical) items should be combined in a bid opportunity with other item(s) from the same seller or from one or more different sellers. In yet another embodiment, the operator of bid processor 250 may decide or may reach a consensus with one or more sellers on whether to combine items in a bid opportunity.

With reference again back to FIG. 1, it is of course necessary to complete the transaction with successful bidders as indicated at stage 110. Such completion involves the delivery of the successfully bid for products and/or services to the buyer. Transaction fulfillment may be accomplished by bid processor 250 as operated by an operator, for example an ASP. Transaction fulfillment may be accomplished by bid processor 250 as operated by a seller. In yet another embodiment, transaction fulfillment may be accomplished by one or more third party fulfillment houses 222 who may be connected to bid processor 250 through network interface 212 so as to receive any necessary fulfillment information.

Transaction fulfillment can include any of the following actions inter-alia: determining a bidder account to charge or credit, determining necessary financing, determining the location of the bidder for example for shipment or pick up, and determining a preferred shipment or pickup method of the bidder. Payment collection may be performed in different embodiments by: the operator of bid processor 250, the seller, a designated third-party payment processor 224, or others as will now be apparent to the reader.

In stage 112, if the quantity of units of the item up for auction has not been depleted by successful bidders, or the quantity of (not necessarily identical) items grouped together for bidding purposes has not yet been depleted the auction continues for other bidders. In some embodiments, the auction can be ended prior to the depletion of the quantity. Depending on the embodiment, the auction can be interrupted, for example, by the seller, the operator of bid processor 250, and/or by a third party operating transaction fulfillment system 222.

There has thus been provided new and improved bidding processes and systems, which includes many of the benefits of both an auction and a traditional retail environment. Like an auction, the invention motivates buyers to purchase items by allowing them to determine and place bids on items, providing them the excitement and satisfaction of a bidding process. Like a more traditional retail sale, the invention provides instant gratification, informing the buyer immediately as to whether a bid is successful. Further, the retailer will be able to utilize existing systems of logistics, customer service and extended warranty, for example, to deliver the best possible value to the customer. The present invention enables sellers to control the minimum price of an item, insuring they obtain their desired price, without placing buyers in the uncomfortable and less-than-desirable position of having to bid against other buyers. The invention provides many different tools and features for facilitating the bidding process, including multiple item sales and buyer group support. The invention further enables new and innovative pricing mechanisms, enabling a buyer to know instantly if they have tendered a successful bid, while still providing a lower price at a later time. The invention has application in the field of commerce and particularly in the field of sales.

While the invention has been shown and described with respect to particular embodiments, it is not thus limited. Numerous modifications, changes and improvements within the scope of the invention will now occur to the reader.

What is claimed is:

1. A computer apparatus for processing bids in an online auction, comprising:

a computer processor, a database for storing data, a network interface configured to receive data and programming from an operator, and a communication interface configured to communicate bi-directionally with user devices over a data communication network, where the apparatus receives, via the system interface, an identification of an item for sale from a seller and a floor price for the item determined by the seller and stores the identification and the floor price in the database;

the identification of the item and a total quantity of the item for sale are transmitted via the network interface to a plurality of bidder devices for bidding by a plurality of bidders;

the processor is programmed to:

suppress, during the auction, the floor price such that the floor price is not available to the plurality of bidders; and limit each of the plurality of bidders to a predetermined number of bids on the item;

the network interface further for receiving, from a first bidder, a first bid for a first quantity of the item less than the total quantity, the first bid within the predetermined number of bids, the first bid including a first bid price determined by the first bidder;

the processor, in response to said receiving, compares the first bid price to the floor price stored in the database; and when the first bid price for the item is at least equal to the floor price, and independent of other bids by other bidders, substantially immediately notifying the first bidder, via the network interface, of the success of the first bid by initiating a sale of the first quantity of the item with the first bidder at the first bid price;

after said notifying, the processor receives, from a second bidder via the network interface, a second bid on a second quantity of the item less than the total quantity in the auction at a second bid price, the second bid price at least equal to the floor price and lower than the first bid price, wherein the processor accepts the second bid from the second bidder; and after said accepting, completes the sale of the first quantity of the item with the first bidder at the second bid price in place of the first bid price, based on the accepting of the second bid, wherein the auction continues when there is a quantity of the item remaining.

2. The apparatus of claim 1 wherein the processor does not allow a display to any bidder the bids of other bidders on the item.

3. The apparatus of claim 2 wherein the processor does not allow a display the floor price of the item to any bidder.

4. The apparatus of claim 1 wherein the predetermined number of bids is one.

5. The method of claim 1 wherein the predetermined number of bids is greater than one.

6. The apparatus of claim 1, where the floor price comprises a range of prices including a minimum price.

7. The apparatus of claim 1 where the processor further completes a second sale with the second bidder for the second quantity of the item at the second bid price.

8. The apparatus of claim 1 further comprising tools for facilitating a group of buyers to bid on the item.

9. The apparatus of claim 1 further comprising tools for facilitating a group of sellers to combine and sell a group of items.

10. The apparatus of claim 1 wherein the item comprises a group of identical items.

* * * * *